(12) United States Patent
Oh et al.

(10) Patent No.: US 8,714,040 B2
(45) Date of Patent: May 6, 2014

(54) MANUAL TRANSMISSION FOR VEHICLES

(75) Inventors: Wan Soo Oh, Yongin-si (KR); Jae Woong Hwang, Yongin-si (KR); Haeng Woo Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 293 days.

(21) Appl. No.: 13/185,294

(22) Filed: Jul. 18, 2011

(65) Prior Publication Data

US 2012/0132021 A1 May 31, 2012

(30) Foreign Application Priority Data

Nov. 30, 2010 (KR) ........................ 10-2010-0120961

(51) Int. Cl.
*F16H 3/08* (2006.01)

(52) U.S. Cl.
USPC ............................................. 74/325; 74/331

(58) Field of Classification Search
USPC .................................... 74/325, 329, 331, 339
See application file for complete search history.

(56) References Cited

U.S. PATENT DOCUMENTS

| | | | | |
|---|---|---|---|---|
| 2,246,636 A * | 6/1941 | Peterson et al. | ................ | 74/333 |
| 5,335,562 A * | 8/1994 | Mastroianni et al. | ............ | 74/329 |
| 5,881,600 A * | 3/1999 | Fan | ................. | 74/329 |
| 6,604,438 B2 * | 8/2003 | Ruhle et al. | ...................... | 74/335 |
| 6,969,338 B2 * | 11/2005 | Dreibholz et al. | .............. | 477/77 |
| 7,255,018 B2 * | 8/2007 | Gumpoltsberger | ............. | 74/331 |
| 7,350,433 B2 * | 4/2008 | Yasui et al. | ...................... | 74/335 |
| 7,735,388 B2 * | 6/2010 | Sakamoto et al. | .............. | 74/339 |
| 8,082,817 B2 * | 12/2011 | Takahara et al. | ................. | 74/339 |
| 8,229,632 B2 * | 7/2012 | Ellis et al. | ....................... | 701/54 |
| 2010/0101345 A1 * | 4/2010 | Moore et al. | .................... | 74/339 |
| 2011/0120244 A1 * | 5/2011 | Geiberger et al. | .............. | 74/339 |
| 2012/0152046 A1 * | 6/2012 | Matsumoto et al. | ............ | 74/333 |

FOREIGN PATENT DOCUMENTS

| | | |
|---|---|---|
| JP | 6-221382 A | 8/1994 |
| JP | 2007-333033 A | 12/2007 |
| KR | 1998-060432 A | 10/1998 |
| KR | 10-0262565 B1 | 8/2000 |

* cited by examiner

*Primary Examiner* — Troy Chambers
*Assistant Examiner* — Alexander Vu
(74) *Attorney, Agent, or Firm* — Morgan, Lewis & Bockius LLP

(57) ABSTRACT

A manual transmission for vehicles includes an input shaft on which a first synchronizer mechanism including first and second input gears, third, fourth, fifth, and sixth input gears are disposed, an output shaft on which a first output gear, first and second speed gears engaged respectively to the first and second input gears, a second synchronizer mechanism including third and fourth speed gears engaged respectively to the third and fourth input gears, and a third synchronizer mechanism including fifth and sixth speed gears engaged respectively to the fifth and sixth input gears, a reverse speed output shaft on which a second output gear and a fourth synchronizer mechanism including a reverse speed gear engaged to the third speed gear, and a driven gear engaged to the first and second output gears so as to receive torque, and delivering the torque to a differential.

7 Claims, 5 Drawing Sheets

MANUAL TRANSMISSION FOR VEHICLES

CROSS-REFERENCE TO RELATED APPLICATION

This application claims priority to and the benefit of Korean Patent Application No. 10-2010-0120961 filed Nov. 30, 2010, the entire contents of which application is incorporated herein for all purposes by this reference.

BACKGROUND OF INVENTION

1. Field of Invention

The present invention relates to a manual transmission for vehicles. More particularly, the present invention relates to a manual transmission for vehicles that improves rattle sensitivity by minimizing rotational inertia of free gears.

2. Description of Related Art

Generally, vibration is generated by impact when teeth of free gears disposed on rotation shafts freely bumps into driving gears fixedly disposed on the rotation shafts. A rattle in a manual transmission for vehicles means that the vibration generated by the impact is transmitted to the rotation shafts, bearings, and a transmission case and noise occurs.

If load is not applied to a free gear FG, teeth of the free gear FG is not engaged with both teeth of a driving gear DG as shown in FIG. 1. At this state, if load (exciting force of an engine) is applied to the free gear FG, the free gear FG moves easily and the teeth of the free gear FG bumps into the teeth of the driving gear DG. Therefore, double side impact occurs, and thereby the rattle occurs.

When the rattle occurs, the double side impact which the free gear FG applies to the rotation shaft is proportional to rotational inertia of the free gear FG, and rattle sensitivity is proportional to total rotational inertia of the free gears.

Gear arrangement of a conventional manual transmission will be described. As shown in FIG. 2, gears that are related to each shift-speed are disposed on an input shaft PIS and an output shaft POS disposed in parallel with the input shaft PIS with a predetermined.

More specifically, first input gear GI1, second input gear GI2, a first synchronizer mechanism PSYN1 having third and fourth input gears GI3 and GI4, and a second synchronizer mechanism PSYN2 having fifth and sixth input gears GI5 and GI6 are sequentially disposed on the input shaft PIS from a front side to a rear side.

Herein, the front side means a side close to an engine and the rear side means a side that is far from the engine.

The first input gear GI1 and the second input gear GI2 are integrally and/or monolithically formed with the input shaft PIS so as to rotate together with the input shaft PIS when the input shaft PIS rotates.

In addition, the third, fourth, fifth, and sixth input gears GI3, GI4, GI5, and GI6 are disposed such that rotations of the third, fourth, fifth, and sixth input gears GI3, GI4, GI5, and GI6 are not directly affected by rotation of the input shaft PIS (that is, free gear), and each input gear GI3, GI4, GI5, and GI6 rotates together with the input shaft PIS through selective engagement with sleeves PS1 and PS2.

In addition, a first output gear POG1, a third synchronizer mechanism PSYN3 having first and second speed gears GO1 and GO2 engaged respectively to the first and second input gears GI1 and GI2, and third, fourth, fifth, and sixth speed gears GO3, GO4, GO5, and GO6 engaged respectively to the third, fourth, fifth, and sixth input gears GI3, GI4, GI5, and GI6 are disposed on the output shaft POS.

The first and second speed gears GO1 and GO2 are disposed such that rotations of the first and second speed gears GO1 and GO2 do not directly affect on rotation of the output shaft POS (that is, free gear), and rotate together with the output shaft POS through selective engagement with a sleeve PS3. The third, fourth, fifth, and sixth speed gears GO3, GO4, GO5, and GO6 are integrally and/or monolithically formed with the output shaft POS.

In addition, a second output gear POG2 and a fourth synchronizer mechanism PSYN4 having a reverse speed gear PRG engaged to the first speed gear GO1 are disposed on a reverse speed output shaft PRS disposed in parallel with the input shaft PIS.

The reverse speed gear PRG is disposed such that rotation of the reverse speed gear PRG does not directly affect on rotation of the reverse speed output shaft PRS, and rotates together with the reverse speed output shaft PRS through selective engagement with a sleeve PS4.

In addition, the first and second output gears POG1 and POG2, as shown in FIG. 3, are engaged to driven gear PDG of a differential so as to output converted torque.

Since the first, second, third, and fourth synchronizer mechanisms PSYN1, PSYN2, PSYN3, and PSYN4 are the same as or similar to a conventional synchronizer mechanism applied to a conventional manual transmission, detailed description thereof will be omitted. In addition, each sleeve PS1, PS2, PS3, and PS4 of the first, second, third, and fourth synchronizer mechanisms PSYN1 PSYN2, PSYN3, and PSYN4, as well known to a person of skilled in the art, is operated by a shift fork that is operated by a shift lever disposed at a driver's seat.

Power delivery paths of the manual transmission at each shift-speed will be discussed.

The torque is output through the input shaft PIS, the first input gear GI1, the first speed gear GO1, the output shaft POS, and the first output gear POG1 at a first forward speed, is output through the input shaft PIS, the second input gear GI2, the second speed gear GO2, the output shaft POS, and the first output gear POG1 at a second forward speed, is output through the input shaft PIS, the third input gear GI3, the third speed gear GO3, the output shaft POS, and the first output gear POG1 at a third forward speed, is output through the input shaft PIS, the fourth input gear GI4, the fourth speed gear GO4, the output shaft POS, and the first output gear POG1 at a fourth forward speed, is output through the input shaft PIS, the fifth input gear GI5, the fifth speed gear GO5, the output shaft POS, and the first output gear POG1 at a fifth forward speed, is output through the input shaft PIS, the sixth input gear GI6, the sixth speed gear GO6, the output shaft POS, and the first output gear POG1 at a sixth forward speed, and is output through the input shaft PIS, the first input gear GI1, the first speed gear GO1, the reverse speed gear PRG, the reverse speed output shaft PRS, and the second output gear POG2 at a reverse speed.

Since the first and second speed gears GO1 and GO2 and the fifth and sixth input gears GO5 and GO6 having large radius are disposed as free gears in a conventional transmission, strong rattle occurs by rotational inertia thereof.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a manual transmission for vehicles having advantages of reducing rattle sensitivity by minimizing rotational inertia of free gears.

A manual transmission for vehicles according to various embodiments of the present invention may include an input shaft having first, second, third, fourth, fifth, and sixth input gears disposed thereon, an output shaft disposed in parallel with the input shaft with a predetermined distance and having a first output gear and first, second, third, fourth, fifth, and sixth speed gears disposed thereon, the first, second, third, fourth, fifth, and sixth speed gears being respectively engaged with the first, second, third, fourth, fifth, and sixth input gears, a reverse speed output shaft disposed in parallel with the output shaft and having a second output gear and a reverse speed gear disposed thereon, the reverse speed gear being engaged with one of the speed gears disposed on the output shaft, and a driven gear engaged to the first and second output gears so as to receive torque, and delivering the torque to a differential, wherein some input gears having large radius among the first, second, third, fourth, fifth, and sixth input gears disposed on the input shaft are fixedly disposed on the input shaft, the other input gears are disposed on the input shaft as free gears, some speed gears engaged with the some input gears among the first, second, third, fourth, fifth, and sixth speed gears disposed on the output shaft is disposed on the output shaft as free gears, and the other speed gears are fixedly disposed on the output shaft.

The first and second speed gears and the third, fourth, fifth, and sixth input gears may be fixedly disposed on the output shaft and the input shaft respectively, and the first and second input gears and the third, fourth, fifth, and sixth gears may be disposed on the input shaft and the output shaft as free gears by synchronizer mechanism.

The reverse speed gear may be engaged with the third speed gear.

The first, second, third, fourth, fifth, and sixth input gears may be sequentially disposed on the input shaft from an engine side.

A manual transmission for vehicles according to other embodiments of the present invention may include an input shaft on which a first synchronizer mechanism having first and second input gears, third, fourth, fifth, and sixth input gears are disposed, an output shaft on which a first output gear, first and second speed gears engaged respectively to the first and second input gears, a second synchronizer mechanism having third and fourth speed gears engaged respectively to the third and fourth input gears, and a third synchronizer mechanism having fifth and sixth speed gears engaged respectively to the fifth and sixth input gears, a reverse speed output shaft on which a second output gear and a fourth synchronizer mechanism having a reverse speed gear engaged to the third speed gear, and a driven gear engaged to the first and second output gears so as to receive torque, and delivering the torque to a differential.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
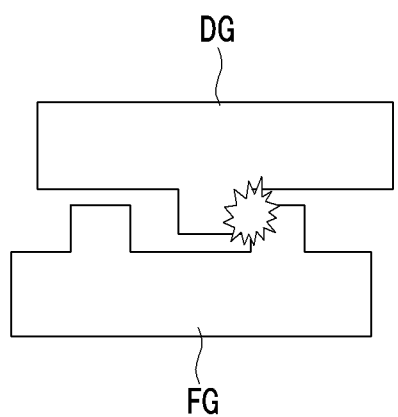
FIG. 1 illustrates occurrence of rattle.
Figure 1:
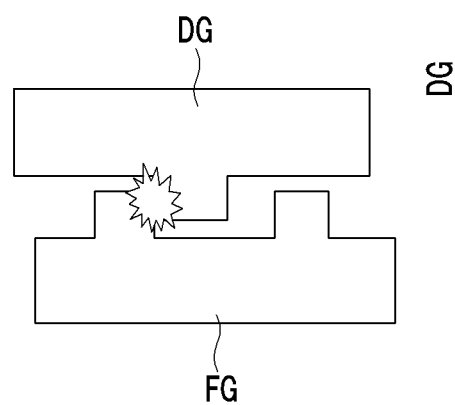
Figure 2:
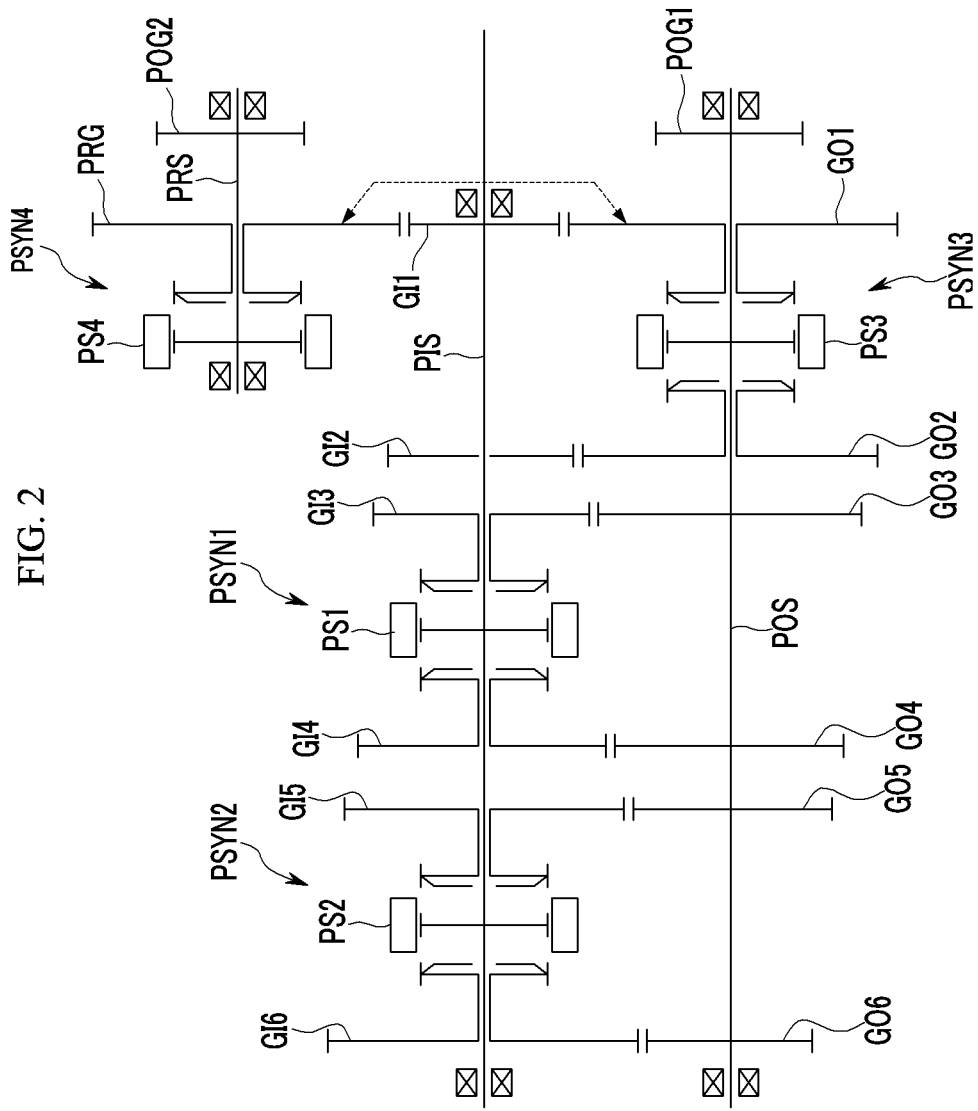
FIG. 2 is a schematic diagram of a conventional manual transmission.
Figure 3:
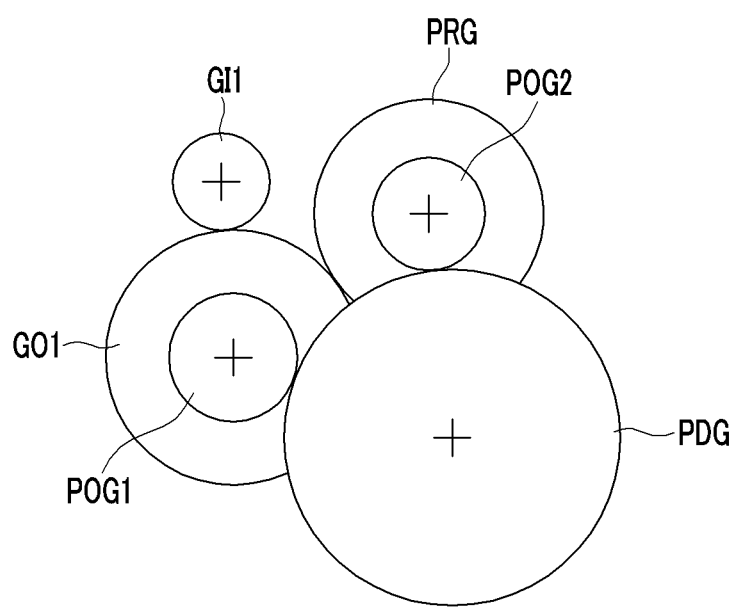
FIG. 3 illustrates engagement of first and second output gears with a driven gear of a differential in a conventional manual transmission.
Figure 4:
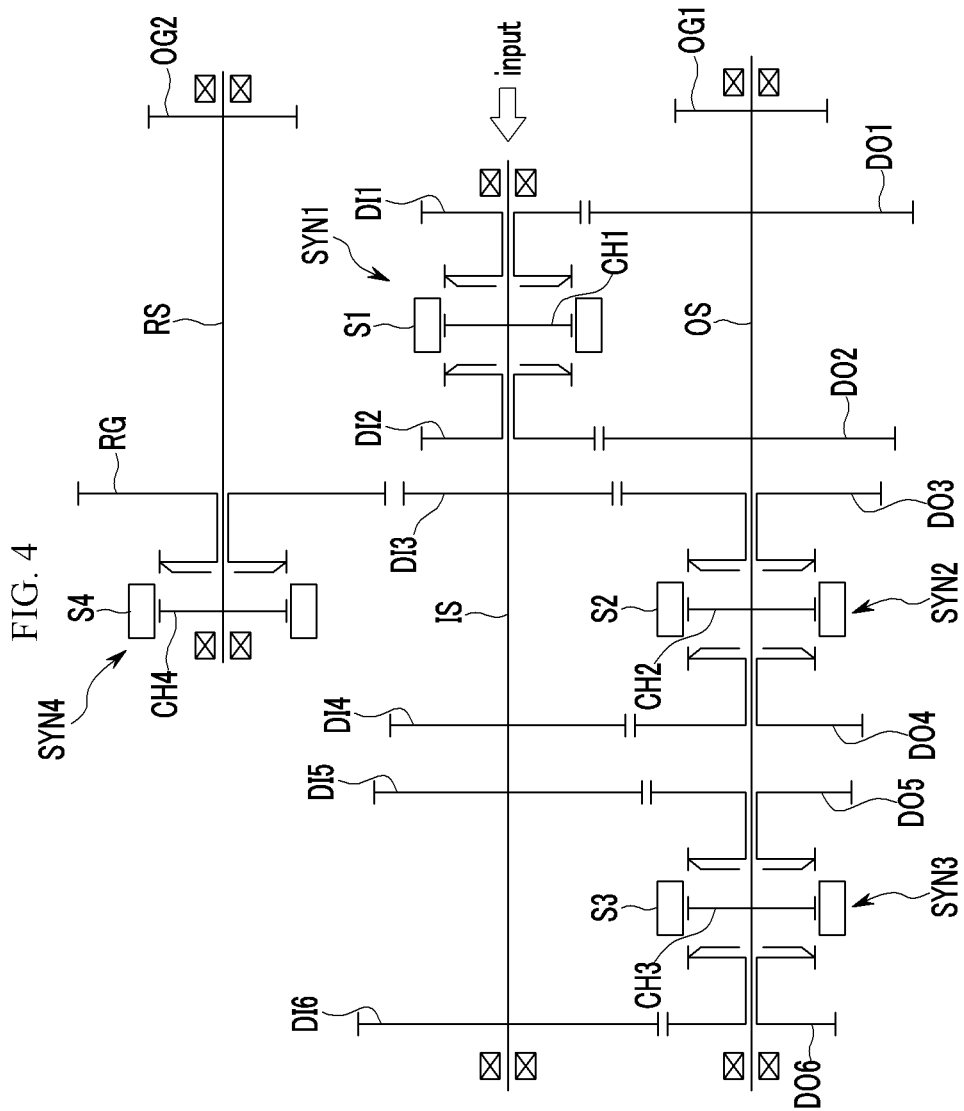
FIG. 4 is a schematic diagram of an exemplary manual transmission according to the present invention.

With reference to FIG. 4, IS represents an input shaft, OS represents an output shaft, and RS represents a reverse speed output shaft.

Rotation shafts IS, OS, and RS are rotatably mounted at a transmission case by interposing rolling elements therebetween, and are disposed in parallel with each other with predetermined distances.

More specifically, a first synchronizer mechanism SYN1 having a first input gear DI1 and a second input gear DI2 and third, fourth, fifth, and sixth input gears DI3, DI4, DI5, and DI6 are sequentially disposed on an input shaft IS from a front side to a rear side.

Herein, the front side means a side close to an engine and the rear side means a side that is far from the engine.

The first and second input gears DI1 and DI2 are disposed such that rotations of the first and second input gears DI1 and DI2 are not directly affected by rotation of the input shaft IS (that is, free gear), and are selectively connected to a clutch hub CH1 by movement of a sleeve S1 of the first synchronizer mechanism SYN1. Therefore, one of the first and second input gears DI1 and DI2 selectively connected to the clutch hub CH1 rotates with the input shaft IS.

In addition, the third, fourth, fifth, and sixth input gears DI3, DI4, DI5, and DI6 are integrally and/or monolithically formed with the input shaft IS so as to always rotate with the input shaft IS.

A first output gear OG1, first and second speed gears DO1 and DO2 engaged respectively to the first and second input gears DI1 and DI2, a second synchronizer mechanism SYN2 having third and fourth speed gears DO3 and DO4 engaged respectively to the third and fourth input gears DI3 and DI4, and a third synchronizer mechanism SYN3 having fifth and sixth speed gears DO5 and DO6 engaged respectively to the fifth and sixth input gears DI5 and DI6 are disposed on an output shaft OS.

The first and second speed gears DO1 and DO2 are integrally and/or monolithically formed with the output shaft OS. The third and fourth speed gears DO3 and DO4 are disposed such that rotations of the third and fourth speed gears DO3 and DO4 do not directly affect on rotation of the output shaft OS (that is, free gear), and are selectively connected to a clutch hub CH2 by movement of a sleeve S2 of the second synchronizer mechanism SYN2. In addition, a sleeve S3 of the third synchronizer mechanism SYN3 moves so as to selectively connect the fifth and sixth speed gears DO5 and DO6 to a clutch hub CH3. Therefore, one of the third, fourth, fifth, and sixth speed gears DO3, DO4, DO5, and DO6 selectively connected to the clutch hubs CH2 and CH3 rotate with the output shaft OS.

A second output gear OG2 and a fourth synchronizer mechanism SYN4 having a reverse speed gear RG engaged to the third speed gear DO3 are disposed on a reverse speed output shaft RS.

The reverse speed gear RG is disposed such that rotation of the reverse speed gear RG does not directly affect on rotation of the reverse speed output shaft RS, and is selectively connected to a clutch hub CH4 by movement of a sleeve S4 of the fourth synchronizer mechanism SYN4. In a case that the reverse speed gear RG is connected to the clutch hub CH4, the reverse speed gear RG rotates with the reverse speed output shaft RS.

Figure 5:
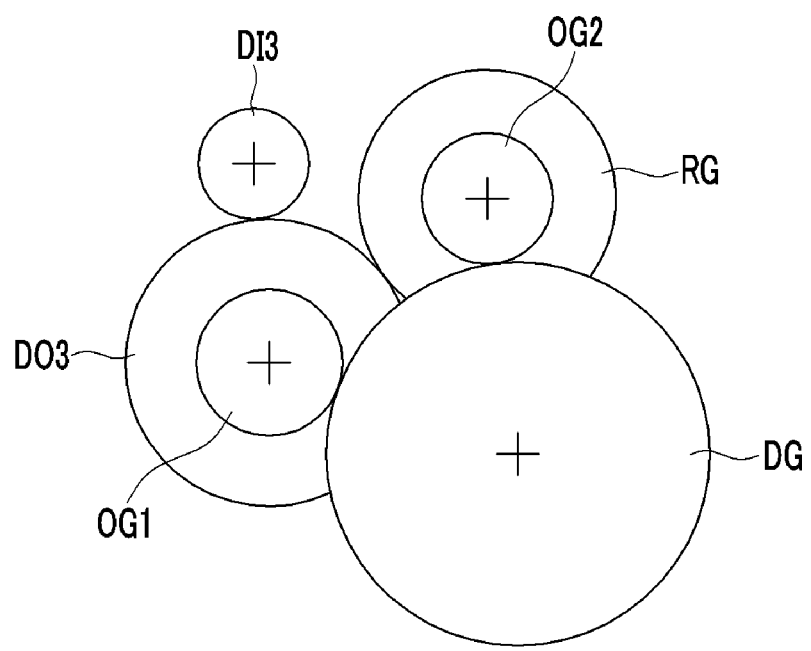
FIG. 5 illustrates engagement of first and second output gears with a driven gear of a differential in an exemplary manual transmission according to the present invention.

In addition, the first and second output gears OG1 and OG2, as shown in FIG. 5, are engaged to a driven gear DG of a differential so as to output converted torque.

Since the first, second, third, and fourth synchronizer mechanisms SYN1, SYN2, SYN3, and SYN4 are the same as or similar to a synchronizer mechanism applied to a conventional manual transmission, detailed description thereof will be omitted. In addition, each sleeve S1, S2, S3, and S4 of the first, second, third, and fourth synchronizer mechanisms SYN1, SYN2, SYN3, and SYN4, as well known to a person of skilled in the art, is operated by a shift fork that is operated by a shift lever disposed at a driver's seat.

Power delivery paths of the manual transmission at each shift-speed will be discussed.

The torque is output through the input shaft IS, the first input gear DI1, the first speed gear DO1, the output shaft OS, and the first output gear OG1 at a first forward speed, is output through the input shaft IS, the second input gear DI2, the second speed gear DO2, the output shaft OS, and the first output gear OG1 at a second forward speed, is output through the input shaft IS, the third input gear DI3, the third speed gear DO3, the output shaft OS, and the first output gear POG1 at a third forward speed, is output through the input shaft IS, the fourth input gear DI4, the fourth speed gear DO4, the output shaft OS, and the first output gear OG1 at a fourth forward speed, is output through the input shaft IS, the fifth input gear DI5, the fifth speed gear DO5, the output shaft OS, and the first output gear OG1 at a fifth forward speed, is output through the input shaft IS, the sixth input gear DI6, the sixth speed gear DO6, the output shaft OS, and the first output gear POG1 at a sixth forward speed, and is output through the input shaft IS, the third input gear DI3, the third speed gear DO3, the reverse speed gear RG, the reverse speed output shaft RS, and the second output gear OG2 at a reverse speed.

According to various embodiments of the present invention, the first and second speed gears DO1 and DO2 and the third, fourth, fifth, and sixth input gears DI3, DI4, DI5, and DI6 having large radius and rotational inertia are fixedly disposed respectively on the output shaft OS and the input shaft IS, and the first and second input gears DI1 and DI2 and the third, fourth, fifth, and sixth gears DO3, DO4, DO5, and DO6 having small radius and rotational inertia are disposed as free gears. Therefore, occurrence of rattle due to rotational inertias of the gears may be minimized.

In addition, since the first speed gear DO1 is a fixed gear, the reverse speed gear RG is engaged to the third speed gear DO3. Particularly, since the first input gear DI1 having smallest rotational inertia at the input shaft IS is disposed as a free gear and runs the first speed gear DO1 having largest rotational inertia at the output shaft OS, rattle sensitivity may be greatly improved.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. A manual transmission for vehicles, comprising:
   an input shaft on which a first synchronizer mechanism including first and second input gears, and third, fourth, fifth, and sixth input gears are disposed;
   an output shaft on which a first output gear, first and second speed gears engaged respectively to the first and second input gears, a second synchronizer mechanism including third and fourth speed gears engaged respectively to the third and fourth input gears, and a third synchronizer mechanism including fifth and sixth speed gears engaged respectively to the fifth and sixth input gears are mounted;
   a reverse speed output shaft on which a second output gear and a fourth synchronizer mechanism including a reverse speed gear engaged to the third speed gear; and
   a driven gear engaged to the first and second output gears so as to receive torque, and delivering the torque to a differential.

2. The manual transmission of claim 1, wherein the third, fourth, fifth, and sixth input gears are fixedly disposed on the input shaft, and the first and second speed gears are fixedly disposed on the output shaft.

3. The manual transmission of claim 1, wherein the first, second, third, fourth, fifth, and sixth input gears are sequentially disposed on the input shaft from an engine side.

4. A manual transmission for vehicles, comprising:
   an input shaft including first, second, third, fourth, fifth, and sixth input gears disposed thereon;
   an output shaft disposed in parallel with the input shaft at a predetermined distance and including a first output gear and first, second, third, fourth, fifth, and sixth speed gears disposed thereon, the first, second, third, fourth, fifth, and sixth speed gears respectively engaging with the first, second, third, fourth, fifth, and sixth input gears;
   a reverse speed output shaft disposed in parallel with the output shaft and including a second output gear and a reverse speed gear disposed thereon, the reverse speed gear engaging with one of the speed gears disposed on the output shaft; and a driven gear engaged to the first and second output gears so as to receive torque, and delivering the torque to a differential;

wherein at least four input gears including larger radius among the first, second, third, fourth, fifth, and sixth input gears disposed on the input shaft are fixedly disposed on the input shaft, the other input gears among the first, second, third, fourth, fifth, and sixth input are disposed on the input shaft as free gears, wherein at least four speed gears engaged with the at least four input gears among the first, second, third, fourth, fifth, and sixth speed gears disposed on the output shaft is disposed on the output shaft as free gears, and the other speed gears among the first, second, third, fourth, fifth, and sixth speed gears are fixedly disposed on the output shaft.

5. The manual transmission of claim 4, wherein the first and second speed gears are fixedly disposed on the output shaft and the third, fourth, fifth, and sixth input gears are fixedly disposed on the input shaft respectively, and wherein the first and second input gears are disposed on the input shaft to form a first synchronizer mechanism and the third, fourth, fifth, and sixth gears are disposed on the output shaft to form a second synchronizer mechanism.

6. The manual transmission of claim 5, wherein the reverse speed gear is engaged with the third speed gear.

7. The manual transmission of claim 5, wherein the first, second, third, fourth, fifth, and sixth input gears are sequentially disposed on the input shaft from an engine side.

\* \* \* \* \*